United States Patent
Hsu et al.

(10) Patent No.: US 11,238,269 B2
(45) Date of Patent: *Feb. 1, 2022

(54) ENCODING AND DECODING METHOD AND INFORMATION RECOGNITION DEVICE USING THE SAME

(71) Applicant: PixArt Imaging Inc., Hsin-Chu County (TW)

(72) Inventors: En-Feng Hsu, Hsin-Chu County (TW); Shu-Sian Yang, Hsin-Chu County (TW); Yi-Hsien Ko, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/013,690

(22) Filed: Sep. 7, 2020

(65) Prior Publication Data

US 2021/0004565 A1 Jan. 7, 2021

Related U.S. Application Data

(63) Continuation of application No. 15/887,318, filed on Feb. 2, 2018, now Pat. No. 10,803,291.

(60) Provisional application No. 62/587,991, filed on Nov. 17, 2017.

(51) Int. Cl.
*G06K 9/00* (2006.01)
*G06K 9/22* (2006.01)
*G06K 9/32* (2006.01)

(52) U.S. Cl.
CPC ..... *G06K 9/00194* (2013.01); *G06K 9/00174* (2013.01); *G06K 9/00181* (2013.01); *G06K 9/222* (2013.01); *G06K 2009/226* (2013.01); *G06K 2009/3225* (2013.01)

(58) Field of Classification Search
None
See application file for complete search history.

(56) References Cited

U.S. PATENT DOCUMENTS

| | | | | |
|---|---|---|---|---|
| 3,613,080 | A * | 10/1971 | Angeloni, Sr | G06K 9/54 382/203 |
| 6,548,768 | B1 * | 4/2003 | Pettersson | G06K 7/1456 178/18.01 |
| 7,145,556 | B2 * | 12/2006 | Pettersson | G06F 3/03545 345/179 |
| 7,546,950 | B2 * | 6/2009 | Thiyagarajah | G06K 7/14 235/462.07 |

(Continued)

*Primary Examiner* — Feng Niu
(74) *Attorney, Agent, or Firm* — WPAT, PC

(57) ABSTRACT

There is provided an encoding and decoding method and an information recognition device using the same. A code block includes a center coding region and a peripheral coding region arranged around the center coding region. The encoding and decoding method uses the feature of at least one microdot included in the center coding region as codes. The encoding and decoding method uses the feature of at least one microdot included in the peripheral coding region as codes. The encoding and decoding method uses the relative feature between the center coding region and the peripheral coding region as codes. The information recognition device compares the read feature with pre-stored features to decode information such as position codes, object codes, parameter codes and control codes.

12 Claims, 11 Drawing Sheets

(56) References Cited

U.S. PATENT DOCUMENTS

| | | | | |
|---|---|---|---|---|
| 7,999,798 B2* | 8/2011 | Pettersson | ............ | G06F 3/0321 |
| | | | | 345/179 |
| 8,061,615 B2* | 11/2011 | Yada | ........................ | G06K 7/14 |
| | | | | 235/462.08 |
| 8,600,099 B2* | 12/2013 | Asano | ................... | G06T 1/0071 |
| | | | | 382/100 |
| 9,704,081 B2* | 7/2017 | Tanaka | ..................... | G06K 1/12 |
| 2002/0199149 A1* | 12/2002 | Nagasaki | ............... | G09B 5/062 |
| | | | | 714/752 |
| 2006/0114484 A1* | 6/2006 | Kitora | ................. | G06K 9/2063 |
| | | | | 358/1.13 |
| 2009/0324100 A1* | 12/2009 | Kletter | ............... | G06F 16/5838 |
| | | | | 382/217 |
| 2013/0011065 A1* | 1/2013 | Yoshida | ............... | G06F 3/0304 |
| | | | | 382/187 |

\* cited by examiner

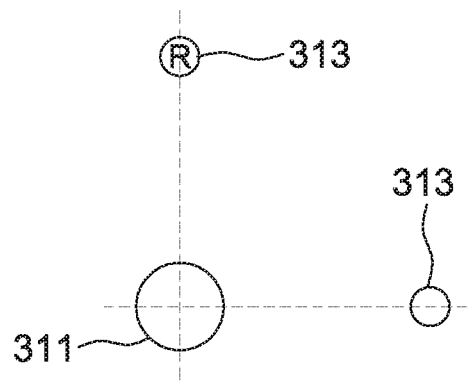
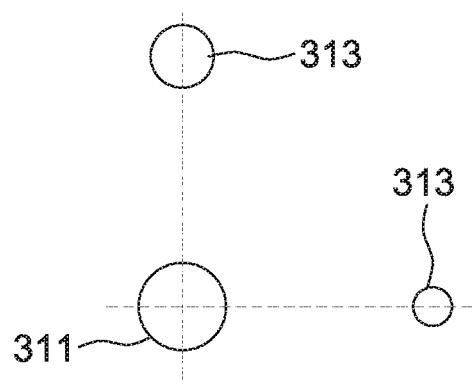
FIG. 11A    FIG. 11B
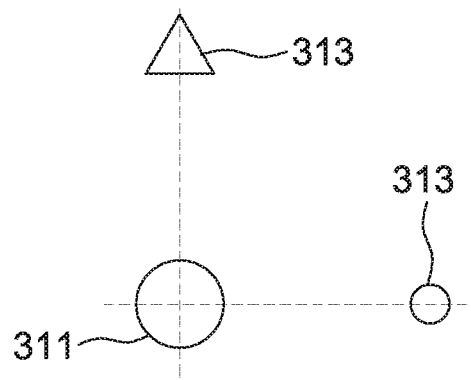
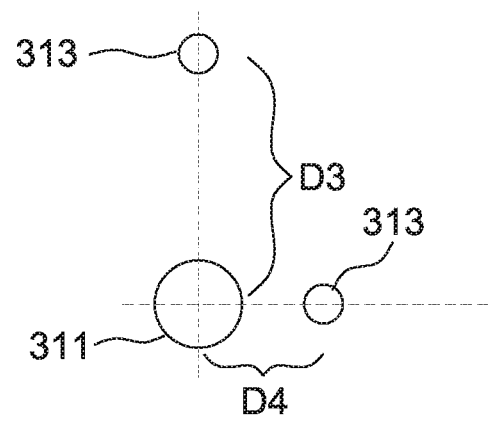
FIG. 11C    FIG. 11D

ENCODING AND DECODING METHOD AND INFORMATION RECOGNITION DEVICE USING THE SAME

CROSS REFERENCE TO RELATED APPLICATION

The present application is a continuation application of U.S. Ser. No. 15/887,318, filed on Feb. 2, 2018, which claims the priority benefit of U.S. Provisional Application Ser. No. 62/587,991, filed on Nov. 17, 2017, the disclosures of which are hereby incorporated by reference herein in their entirety.

BACKGROUND

1. Field of the Disclosure

This disclosure generally relates to an encoding and decoding method and, more particularly, to an encoding and decoding method using a center coding region and a peripheral coding region and an information recognition device using the same.

2. Description of the Related Art

Please refer to FIG. 1, it shows a conventional handwriting recognition system which includes a read/write medium 91 and a scanning device 92. A microdot matrix, which includes a plurality of visually negligible position codes 911, is formed on the read/write medium 91.

Please refer to FIGS. 2a and 2b, each position code 911 generally includes a header region 9111 and a data region 9112, wherein microdots 9113 distributed with different combinations and permutations are formed in the data region 9112 of every position codes 911 whereas microdots 9113 distributed in a fixed combination and permutation are formed in the header region 9111 of every position codes 911. In FIG. 2b, the microdots 9113 included in the position code 911 shown in FIG. 2a are replaced by the binary bits, i.e. positions with a microdot 9113 therein are replaced with the binary bit "1" and positions without a microdot 9113 therein are replaced with the binary bit "0".

The scanning device 92 has an image sensor 921 for fetching images of the position codes 911. In this way, a user may utilize the scanning device 92 to write on the read/write medium 91, and a processing unit (not shown in FIG. 1) will then compare the image of the data region 9112 of the position code 911 fetched by the image sensor 921 with a database so as to recognize a current position and motion of the scanning device 92.

The present disclosure further provides an encoding and decoding method different from the above conventional method. In the present disclosure, a peripheral coding region is arranged around a center coding region. Features of the peripheral coding region and the center coding region as well relative features therebetween are used to encode information. In the present disclosure, the encoding and decoding utilize not only the positions of microdots such that a number of valid codes is increased.

SUMMARY

Accordingly, the present disclosure provides an encoding and decoding method and an information recognition device that use the position as well as other features of microdots to perform the encoding and decoding so as to effectively increase a number of usable codes.

The present disclosure provides an encoding method of one feature code among multiple feature codes on a read medium. The encoding method includes the steps of: arranging at least one center microdot having a center coding feature; arranging at least one peripheral microdot having a peripheral coding feature, wherein the at least one peripheral microdot is arranged around the at least one center microdot; arranging a relative coding feature between the at least one center microdot and the at least one peripheral microdot; determining a start direction of feature coding of the one feature code according to at least one of the center coding feature, the peripheral coding feature and the relative coding feature; and performing the feature coding using the center coding feature and at least one of the peripheral coding feature and the relative coding feature in a clockwise direction or a counterclockwise direction from the start direction of the one feature code.

The present disclosure further provides an information recognition device for decoding feature codes on a read medium. The information recognition device includes an image sensor, a memory and a processor. The image sensor is configured to capture a current image. The memory is configured to previously store a plurality of predetermined feature codes each comprising at least one center microdot having a center coding feature, at least one peripheral microdot having a peripheral coding feature and a relative coding feature between the at least one center microdot and the at least one peripheral microdot. The processor is configured to analyze a feature code in the current image, compare the analyzed feature code with the plurality of predetermined feature codes in the memory, determine a coding direction in a clockwise direction or a counterclockwise direction within the analyzed feature code in the current image according to at least one of the center coding feature, the peripheral coding feature and the relative coding feature, and read coding information, which corresponds to the analyzed feature code in the current image, from the memory.

The present disclosure further provides a decoding method of an information recognition device including an image sensor, a memory and a processor. The decoding method includes the steps of: capturing, by the image sensor, a current image; comparing, by the processor, a feature code in the current image with a plurality of predetermined feature codes stored in the memory to confirm whether a predetermined center coding feature is contained; comparing, by the processor, the feature code in the current image with the plurality of predetermined feature codes stored in the memory to confirm whether a predetermined complete coding feature is contained; reading, from the memory, coding information corresponding to the predetermined complete coding feature; and determining a start code within the feature code in the current image according to the predetermined center coding feature when the feature code in the current image contains the predetermined complete coding feature.

In the encoding and decoding system of the present disclosure, the information recognition device preferably reads an entire code block of every code to perform the decoding. When a complete code image is not acquired, the decoding is not performed.

In the encoding and decoding system of the present disclosure, a coding direction and encoded data are defined according to at least one of a size, a color, a shape, a number, a permutation and reflectivity of a center region code.

In the encoding and decoding system of the present disclosure, a coding direction and encoded data are defined according to at least one of a size, a color, a shape, a number, a permutation and reflectivity of a peripheral region code.

In the encoding and decoding system of the present disclosure, a coding direction and encoded data are defined according to at least one of a relative distance and a relative angle between the peripheral region code and the center region code.

BRIEF DESCRIPTION OF THE DRAWINGS

Other objects, advantages, and novel features of the present disclosure will become more apparent from the following detailed description when taken in conjunction with the accompanying drawings.

FIGS. 11A-11D are schematic diagrams of some embodiments which define a coding direction using at least one microdot of a peripheral coding region in the present disclosure.

DETAILED DESCRIPTION OF THE EMBODIMENT

It should be noted that, wherever possible, the same reference numbers will be used throughout the drawings to refer to the same or like parts.

Figure 1:
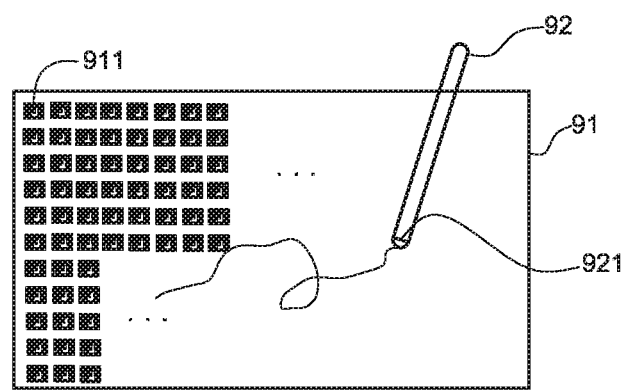
FIG. 1 is a schematic diagram of a conventional handwriting recognition system.
Figures 2A, 2B:
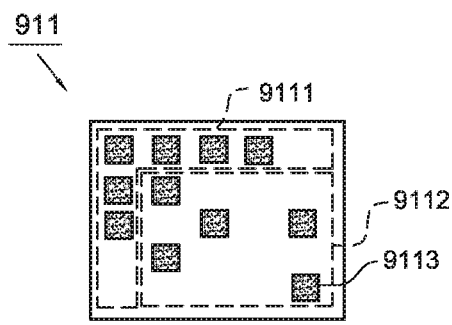
FIG. 2a is a schematic diagram of the position code in the conventional handwriting recognition system.
FIG. 2b is a schematic diagram of the position code in FIG. 2a represented by binary bits.
Figure 3:
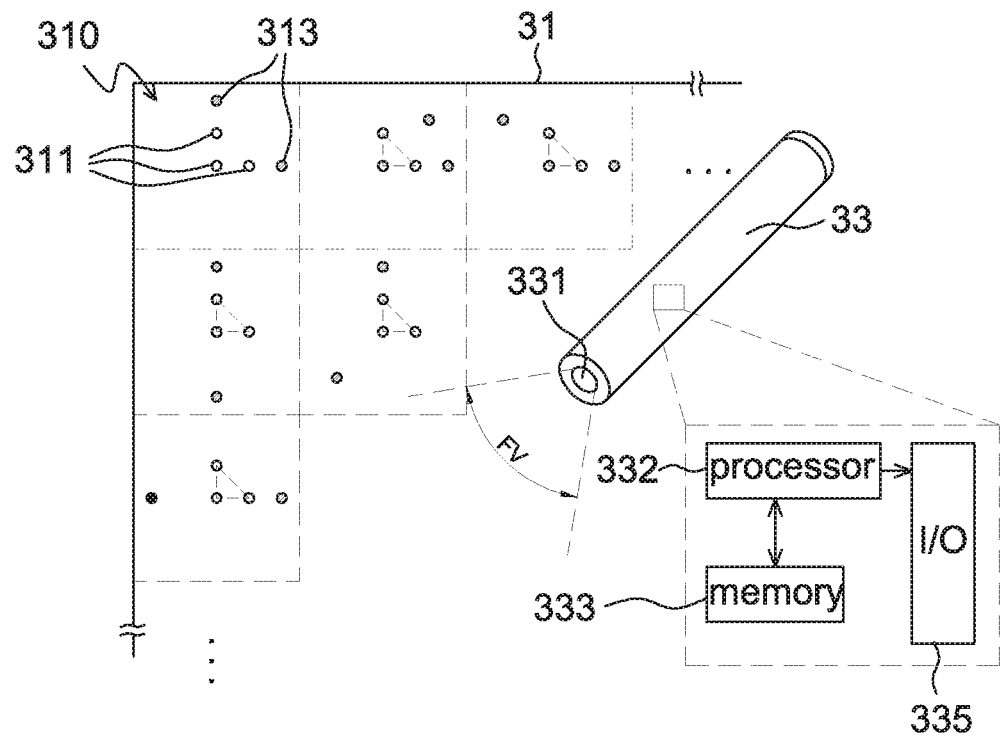
FIG. 3 is a schematic diagram of an information recognition system according to an embodiment of the present disclosure.

Referring to FIG. 3, it is a schematic diagram of an information recognition system according to one embodiment of the present disclosure. The information recognition system includes a read medium 31 and an information recognition device 33. For showing clearly, the size ratio between every component in FIG. 3 has been adjusted. Generally, a size of microdots, e.g., 311 and 313, is arranged to be visually negligible. In addition, dotted lines in FIG. 3 are drawn for illustration purposes. In actual implementation, the dotted lines are not necessary to be formed on a surface of the read medium 31.

The read medium 31 is any suitable object, e.g., documents, books, device casing or the like without particular limitations, which can be read by the information recognition device 33. A surface of the read medium 31 is a plane surface or a curved surface which is formed with a plurality of code blocks 310 (e.g., the code blocks 31 divided by dotted lines in FIG. 3). It should be mentioned that although FIG. 3 shows multiple code blocks 310 arranged in a matrix, but the present disclosure is not limited thereto. In other embodiments, an outer edge enclosing the plurality of code blocks 310 is not a rectangle but an arbitrary shape or a predetermined shape. It should be mentioned that said outer edge is not referred to a line actually drawn on the read medium 31 but referred to a visual shape represented by the arrangement of the plurality of code blocks 310. It is possible that the read medium 31 is formed with multiple groups of code blocks 310, and each group has a predetermined shape identical to or different from others.

Identical or different feature codes are formed in different code blocks 310 according to different applications. In a non-limiting embodiment, when the code blocks 310 include position codes, different feature codes are formed in different code blocks 310 to indicate different coordinates or positions. In a non-limiting embodiment, when the code blocks 310 include object codes, identical feature codes are formed in the code blocks 310 within the same object (e.g., a picture or a device) but different feature codes are formed in the code blocks 310 within different objects. In a non-limiting embodiment, when the code blocks 310 include parameter codes or control codes, different code blocks 310 corresponding to different retrieving parameters or control signals are disposed with different feature codes. More specifically, the feature codes of the present disclosure include one or a combination of position codes, object codes, parameter codes and control codes.

The information recognition device 33 is formed similar to a pen as shown in FIG. 3 to be easily held by a user, but limited thereto. The information recognition device 33 is manufactured properly without particular limitations as long as it is suitable to be operated by a user on the read medium 31 to change a position thereon to read different code blocks 310. For example, the information recognition device 33 is formed as a device to be worn on a finger of a user or formed similar to a mouse device.

The information recognition device 33 includes an image sensor 331, a processor 332, a memory 333 and a transmission interface (I/O) 335. In some embodiments, the information recognition device 33 further includes a light source (not shown) configured to provide light required by the image sensor 331 during acquiring images. The light source is a coherent light source, non-coherent light source or a partially coherent light source without particular limitations. If the information recognition device 33 does not include a light source, the image sensor 331 captures images based on ambient light or a light source embedded under the read medium 31. For example, the read medium 31 is formed of opaque material, and the microdots 311 and 313 are transparent to light under the read medium 31; or the read medium 31 is transparent to light under the read medium 31, and the microdots 311 and 313 are formed of opaque material.

The image sensor 331 is, for example, a CMOS image sensor, a CCD image sensor or the like, and has a field of view FV. The field of view FV is larger enough to cover a code block 310 at a predetermined distance between the image sensor 331 and the read medium 31 so as to acquire a complete image of one code block 310. For example, a size of the field of view FV is arranged to capture a complete image of one code block 310 and partial images of other code blocks 310 at the same time. The image sensor 331 is used to capture a current image containing a center coding region and a peripheral coding region (described by examples hereinafter) on the read medium 31.

The memory 333 includes, for example, at least a non-volatile memory and is used to previously store a plurality of predetermined feature codes, which correspond to every code formed within the code blocks 310 on the read medium 31. Accordingly, a number of the predetermined feature codes is previously determined according to a number of different codes in the code blocks 310 arranged on the read medium 31.

The processor 332 is, for example, a digital signal processor (DSP), a micro processing unit (MCU), an application specific integrated circuit (ASIC) or other processing unit capable of converting raw data of the image sensor 331 into digital data and performing the digital data processing. The processor 332 is electrically coupled to the image sensor 331 for receiving the current image and analyzing the feature code in the current image. The processor 332 further compares the analyzed feature code with a plurality of predetermined feature codes in the memory 333. When a match is found, the processor 332 reads code information corresponding to the analyzed feature code in the current image. The code information is also previously stored, respectively corresponding to the plurality of predetermined feature codes, in the memory 333.

The transmission interface 335 is, for example, a wireless or a wired transmission interface, and used to send the code information to or receive control signals from an external electronic device, wherein the wireless and wired techniques are known to the art and thus details thereof are not described herein. In a non-limiting embodiment, when the feature code includes a position code, the transmission interface 335 sends position information to the external electronic device to indicate a current position or coordinate of the information recognition device 33 on the read medium 31. In a non-limiting embodiment, when the feature code includes an object code, the transmission interface 335 sends object information (e.g., object ID) to the external electronic device to indicate an object on the read medium 31 currently pointed by the information recognition device 33. In a non-limiting embodiment, when the feature code includes a control code, the transmission interface 335 sends control information to the external electronic device to correspondingly control the ON/OFF or operations of the external electronic device. In a non-limiting embodiment, when the feature code includes a parameter code, the transmission interface 335 sends parameter information to the external electronic device to allow the external electronic device to retrieve operating parameters.

Referring to FIGS. 3 and 3A-3C together, each code block 310 on the read medium 31 includes a center coding region Ac and a peripheral coding region Ap around the center coding region Ac. The center coding region Ac includes at least one center microdot 311 (e.g., 3 microdots are shown in FIG. 3), and the peripheral coding region Ap includes at least one peripheral microdot 313 (e.g., 2 microdots are shown in FIG. 3). In a non-limiting embodiments, the center coding region Ac has a center radius $r_A$, and the peripheral coding region Ap is separated from the center coding region Ac by a relative distance $d_{AP}$, which is preferably larger than or equal to twice of the center radius $r_A$ to allow the information recognition device 33 (or the processor 332 thereof) to distinguish the center coding region Ac and the peripheral coding region Ap. That is, no microdot is arranged within the relative distance $d_{AP}$ between the center coding region Ac and the peripheral coding region Ap. It should be mentioned that the center radius $r_A$ is not limited to a radius of a circle as long as the center radius $r_A$ is used to indicate a size of the center coding region Ac.

Figures 3A, 3B, 3C:
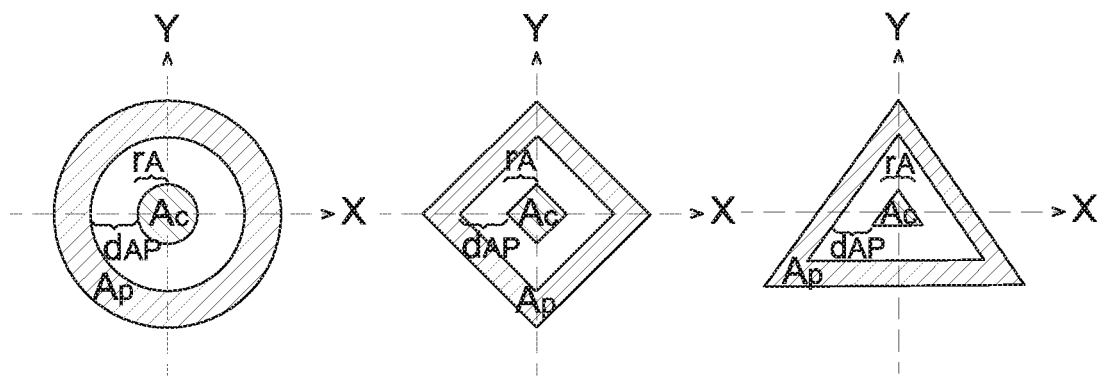
FIGS. 3A-3C are schematic diagrams of a center coding region and a peripheral coding region according to some embodiments of the present disclosure.

It should be mentioned that although FIG. 3A shows the center coding region Ac and the peripheral coding region Ap by concentric circles, it is only intended to illustrate but not to limit the present disclosure. In other embodiments, the center coding region Ac and the peripheral coding region Ap are arranged in other shapes without particular limitations as long as the peripheral coding region Ap is arranged around the center coding region Ac, e.g., as shown in FIGS. 3B and 3C.

In addition, peripheral microdots 313 of the peripheral coding region Ap are not limited to be arranged at four outward directions around the center coding region Ac but arranged at only one side or more than one side around the center coding region Ac.

However, when the information recognition device 33 identifies the center coding region Ac according to the specific pattern (described by examples below) of the center coding region Ac, a value of the relative distance $d_{AP}$ needs not to be limited. For example, when center microdots 311 of the center coding region Ac are arranged in a predetermined pattern, the peripheral microdots 313 within the peripheral coding region Ap are not limited to be arranged outside the relative distance $d_{AP}$ as long as none of the peripheral microdots 313 is arranged to form the predetermined pattern with the center microdots 311.

When the center coding region Ac contains multiple center microdots 311, the relative distance $d_{AP}$ is a distance of at least one peripheral microdot 313 of the peripheral coding region Ap from an average gravity center of the multiple center microdots 311 of the center coding region Ac, or a distance from a gravity center of one center microdot 311 (e.g., the microdot at a center position or any other one as long as the selecting method is previously stored in the memory 333) in the center coding region Ac. In a non-limiting embodiment, when multiple peripheral microdots 313 are used, the relative distance $d_{AP}$ is a shortest relative distance or an average relative distance associated with the multiple peripheral microdots 313. In a non-limiting embodiment, the position of one microdot mentioned in the present disclosure is referred to a gravity center of the microdot.

Next, the encoding method of the center coding region Ac and the peripheral coding region Ap in the code block 310 is illustrated by non-limiting embodiments hereinafter.

The center coding region Ac includes at least one center microdot 311, and the at least one center microdot 311 has a center coding feature. The center coding feature includes one or a combination of a size, a color, a shape, a number, reflectivity and a permutation of the at least one center microdot 311.

Figure 4A:
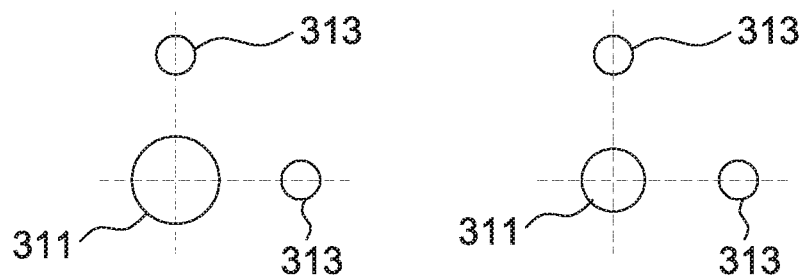
FIGS. 4A-4C are schematic diagrams of some embodiments encoded using a single center microdot of a center coding region in the present disclosure.
Figure 4B:
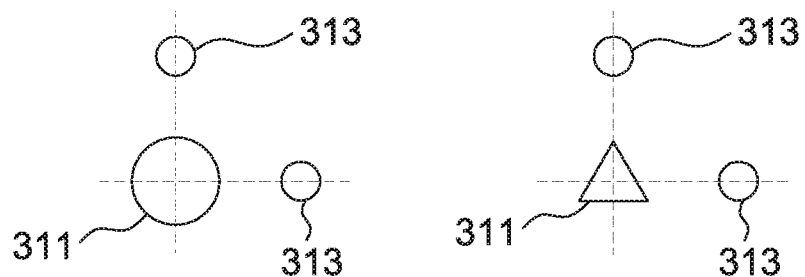
Figure 4C:
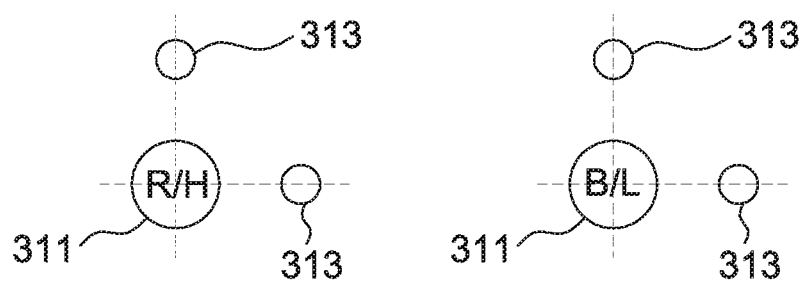

For example referring to FIGS. 4A-4C, they show embodiments of encoding using a single center microdot 311. In these embodiments, only the feature variation of the single center microdot 311 is considered, and it is assumed that the feature of the peripheral microdots 313 is not changed to simplify the illustration.

FIG. 4A shows that the feature coding is performed using a size of the center microdot 311. In a non-limiting embodiment, when the center microdot 311 is larger (e.g., larger than a predetermined size), the feature coding thereof with respect to one adjacent peripheral microdot 313 is set as (0,0); whereas when the center microdot 311 is smaller (e.g., smaller than the predetermined size), the feature coding thereof with respect to one adjacent peripheral microdot 313 is set as (1,0). For example, FIG. 4A shows the center microdot 311 being adjacent to two peripheral microdots 313. The feature coding between the larger center microdot 311 (e.g., left part of the figure) with respect to two adjacent peripheral microdots 313 is set as (0,0,0), and the smaller center microdot 311 (e.g., right part of the figure) with respect to two adjacent peripheral microdots 313 is set as (1,0,0). It is appreciated that the coding and bit numbers of the above (0,0), (1,0), (0,0,0) and (1,0,0) are selected in other ways according to different applications, and not limited to those mentioned in the present disclosure.

FIG. 4B shows that the feature coding is performed using a shape of the center microdot 311. In a non-limiting embodiment, when the center microdot 311 is a circle, the feature coding thereof with respect to one adjacent peripheral microdot 313 is set as (0,0); whereas when the center microdot 311 is a triangle, the feature coding thereof with respect to one adjacent peripheral microdot 313 is set as (1,0). For example, FIG. 4B shows the center microdot 311 being adjacent to two peripheral microdots 313. The feature coding between the circular center microdot 311 (e.g., left part of the figure) with respect to two adjacent peripheral microdots 313 is set as (0,0,0), and the triangular center microdot 311 (e.g., right part of the figure) with respect to two adjacent peripheral microdots 313 is set as (1,0,0). Similarly, the coding and bit numbers of the above (0,0), (1,0), (0,0,0) and (1,0,0) are selected in other ways according to different applications, and not limited to those mentioned in the present disclosure.

FIG. 4C shows that the feature coding is performed using a color (R,B) or reflectivity (H,L) of the center microdot 311. It is appreciated that when the color coding is used, the image sensor 331 is a color image sensor. Different reflectivity is identified according to intensity of the microdot in the captured image. In a non-limiting embodiment, when the center microdot 311 is red (R) or has high reflectivity (H), the feature coding thereof with respect to one adjacent peripheral microdot 313 is set as (0,0); whereas when the center microdot 311 is blue (B) or has low reflectivity (L), the feature coding thereof with respect to one adjacent peripheral microdot 313 is set as (1,0). For example, FIG. 4C shows the center microdot 311 being adjacent to two peripheral microdots 313. The feature coding between the center microdot 311, which has red (R) color or high reflectivity (H) (e.g., left part of the figure), with respect to two adjacent peripheral microdots 313 is set as (0,0,0), and the center microdot 311, which has blue (B) color or low reflectivity (L) (e.g., right part of the figure), with respect to two adjacent peripheral microdots 313 is set as (1,0,0). Similarly, the coding and bit numbers of the above (0,0), (1,0), (0,0,0) and (1,0,0) are selected in other ways according to different applications, and not limited to those mentioned in the present disclosure.

Figure 5A:
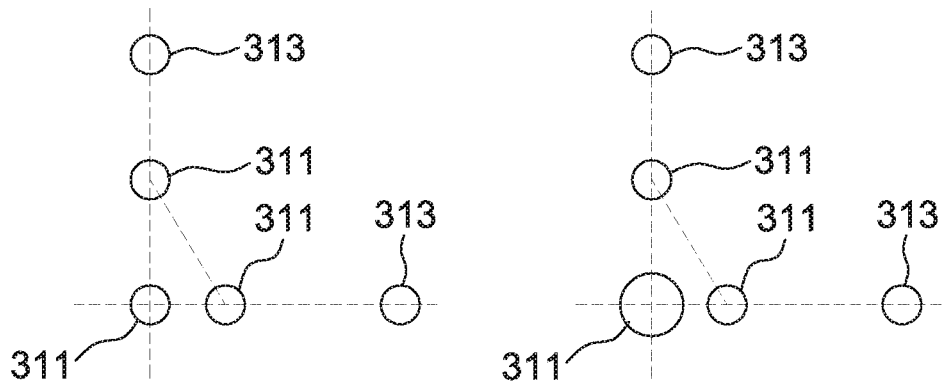
FIGS. 5A-5C are schematic diagrams of some embodiments encoded using multiple microdots of a center coding region in the present disclosure.
Figure 5B:
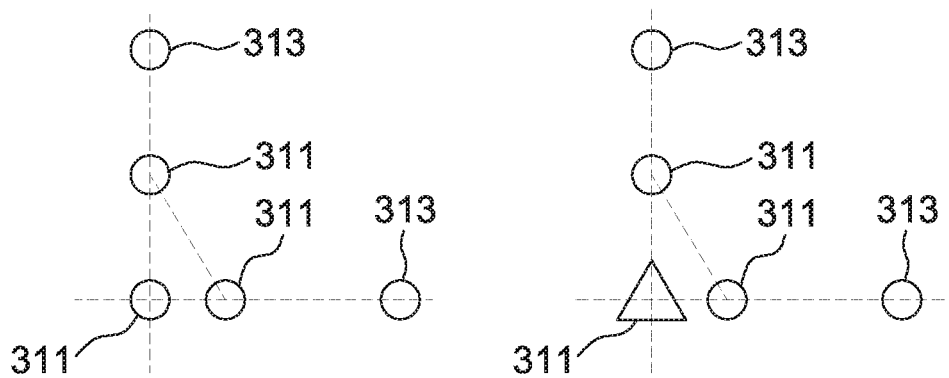
Figure 5C:
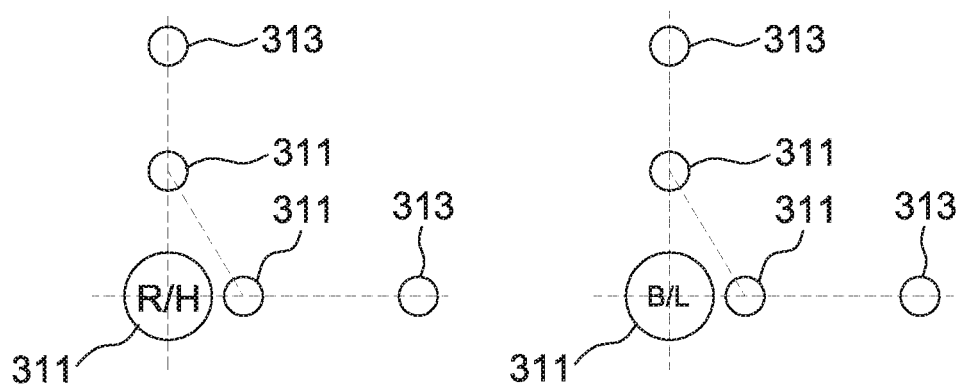

Referring to FIGS. 5A-5C, they show embodiments of encoding using multiple center microdots 311. In these embodiments, only the feature variation of the multiple center microdots 311 is considered, and it is assumed that the feature of the peripheral microdots 311 is not changed to simplify the illustration.

FIG. 5A shows that the feature coding is performed using a size of the center microdots 311. In a non-limiting embodiment, when the multiple center microdots 311 have identical sizes, the feature coding thereof with respect to one adjacent peripheral microdot 313 is set as (0,1); whereas when the multiple center microdots 311 have different sizes, the feature coding thereof with respect to one adjacent peripheral microdot 313 is set as (1,1). For example, FIG. 5A shows the center microdots 311 being adjacent to two peripheral microdots 313. The feature coding between the center microdots 311, which have identical sizes (e.g., left part of the figure), with respect to two adjacent peripheral microdots 313 is set as (0,1,0), and the center microdots 311, which have different sizes (e.g., right part of the figure), with respect to two adjacent peripheral microdots 313 is set as (1,1,0). It is appreciated that the coding and bit numbers of the above (0,1), (1,1), (0,1,0) and (1,1,0) are selected in other ways according to different applications, and not limited to those mentioned in the present disclosure.

FIG. 5B shows that the feature coding is performed using a shape of the center microdots 311. In a non-limiting embodiment, when the multiple center microdots 311 are all circles, the feature coding thereof with respect to one adjacent peripheral microdot 313 is set as (0,1); whereas when one of the multiple center microdots 311 is a triangle, the feature coding thereof with respect to one adjacent peripheral microdot 313 is set as (1,1). For example, FIG. 5B shows the center microdots 311 being adjacent to two peripheral microdots 313. The feature coding between the multiple center microdots 311, which all have a circular shape (e.g., left part of the figure), with respect to two adjacent peripheral microdots 313 is set as (0,1,0), and the feature coding between the multiple center microdots 311, one of which has a triangular shape (e.g., right part of the figure), with respect to two adjacent peripheral microdots 313 is set as (1,1,0). Similarly, the coding and bit numbers of the above (0,1), (1,1), (0,1,0) and (1,1,0) are selected in other ways according to different applications, and not limited to those mentioned in the present disclosure.

FIG. 5C shows that the feature coding is performed using a color (R,B) or reflectivity (H,L) of the center microdots 311. In a non-limiting embodiment, when the multiple center microdots 311 include one or more red (R) or high reflectivity (H) microdots, the feature coding thereof with respect to one adjacent peripheral microdot 313 is set as (0,1); whereas when the multiple center microdots 311 include one or more blue (B) or low reflectivity (L) microdots, the feature coding thereof with respect to one adjacent peripheral microdot 313 is set as (1,1). For example, FIG. 5C shows the center microdots 311 being adjacent to two peripheral microdots 313. The feature coding between the center microdots 311, which include the red (R) color or high reflectivity (H) microdot (e.g., left part of the figure), with respect to two adjacent peripheral microdots 313 is set as (0,1,0), and the center microdots 311, which include the blue (B) color or low reflectivity (L) microdot (e.g., right part of the figure), with respect to two adjacent peripheral microdots 313 is set as (1,1,0). Similarly, the coding and bit numbers of the above (0,1), (1,1), (0,1,0) and (1,1,0) are selected in other ways according to different applications, and not limited to those mentioned in the present disclosure.

In addition, it is also possible to perform the feature coding according to a number of the center microdots 311. For example, a number of center microdots 311 in FIGS. 4A-4C is 1 and a number of center microdots 311 in FIGS. 5A-5C is 3. In a non-limiting embodiment, the feature coding corresponding to one center microdot 311 is set as 2-bit coding, and the feature coding corresponding to three center microdots 311 is set as 3-bit coding. More specifically, different numbers of center microdots 311 is coded by different-bit coding.

In addition, it is also possible to perform the feature coding according to a permutation of multiple center microdots 311. In a non-limiting embodiment, the triangular arrangement of multiple center microdots 311 as shown in FIGS. 5A-5C is set as a predetermined code different from that of the rectangular arrangement (not shown) of multiple center microdots 311. More specifically, different feature codes are formed when the multiple center microdots 311 have different distributions.

The peripheral coding region Ap includes at least one peripheral microdot 313, and the at least one peripheral microdot 313 has a peripheral coding feature. The peripheral coding feature includes one or a combination of a size, a color, a shape, a number, reflectivity and a permutation of the at least one peripheral microdot 313.

Figure 6A:
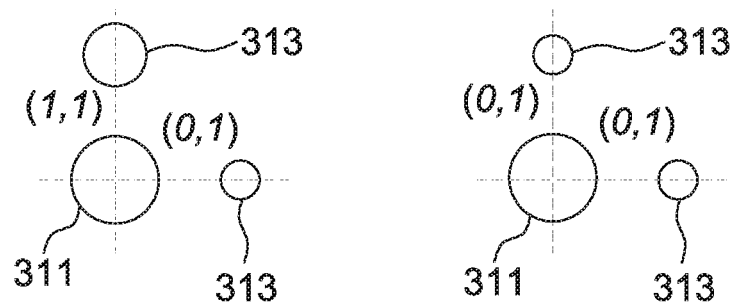
FIGS. 6A-6C are schematic diagrams of some embodiments encoded using at least one microdot of a peripheral coding region in the present disclosure.
Figure 6B:
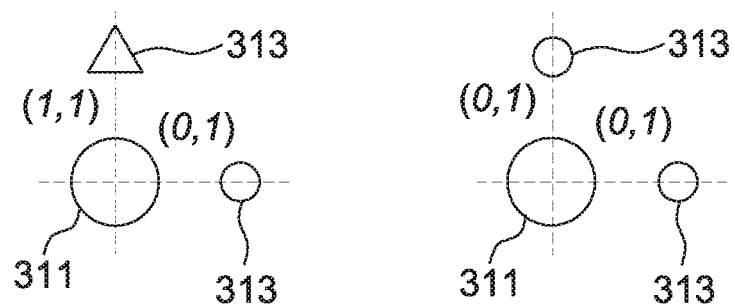
Figure 6C:
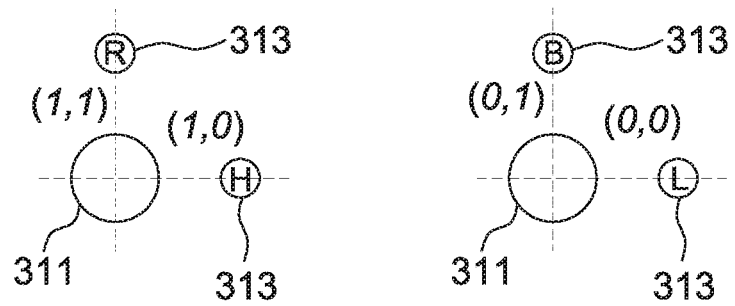
Figure 7A:
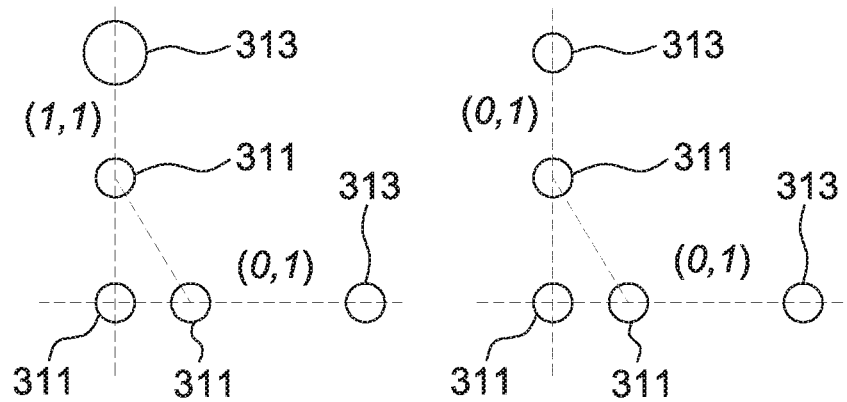
FIGS. 7A-7C are schematic diagrams of alternative embodiments encoded using at least one microdot of a peripheral coding region in the present disclosure.
Figure 7B:
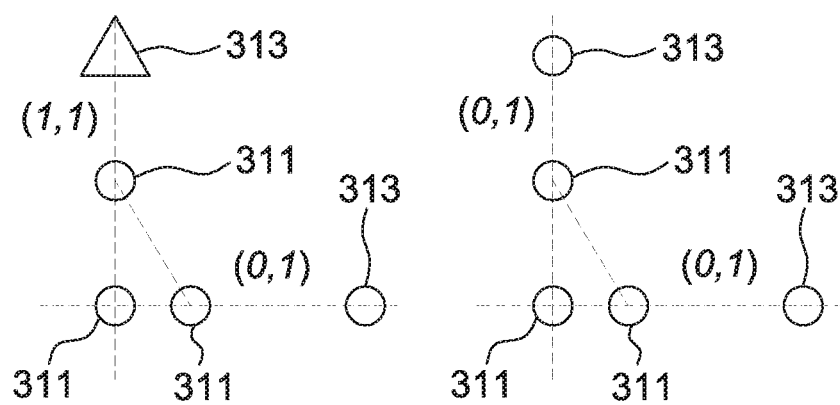
Figure 7C:
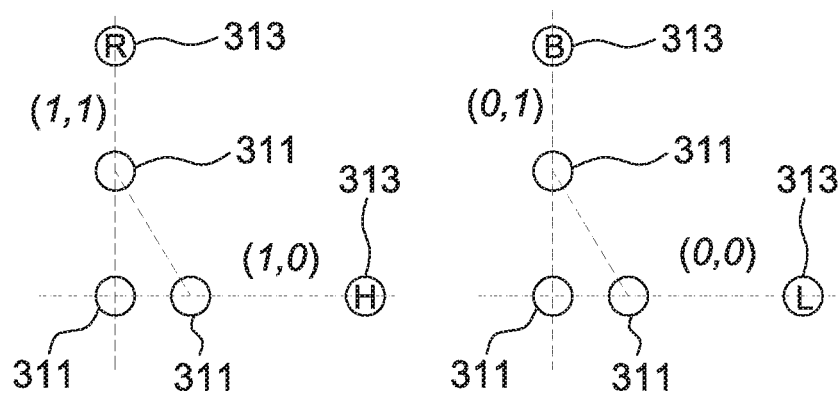

For example referring to FIGS. 6A-6C and 7A-7C, wherein FIGS. 6A-6C show embodiments of encoding using a single center microdot 311; and FIGS. 7A-7C show embodiments of encoding using multiple center microdots 311. In these embodiments, only the feature variation of the peripheral microdot 313 is considered, and it is assumed that the feature of the center microdots 311 is not changed to simplify the illustration.

FIGS. 6A and 7A show that the feature coding is performed using a size of the peripheral microdot 313. In a non-limiting embodiment, when the peripheral microdot 313 is larger (e.g., larger than a predetermined size), the feature coding thereof with respect to the center microdot 311 is set as (1,1); whereas when the peripheral microdot 313 is smaller (e.g., smaller than the predetermined size), the feature coding thereof with respect to the center microdot 311 is set as (0,1). For example, FIGS. 6A and 7A show the center microdot 311 being adjacent to two peripheral microdots 313. The feature coding of the left part of figures is set as including two 2-bit codes (1,1) between the upper peripheral microdot 313 and the center microdot(s) 311 and (0,1) between the right peripheral microdot 313 and the center microdot(s) 311, and the right part of figures is set as including two 2-bit codes (0,1) between the upper peripheral microdot 313 and the center microdot(s) 311 and (0,1) between the right peripheral microdot 313 and the center microdot(s) 311. If a coding direction is not defined, a sequence of said two 2-bit codes is not limited. It is appreciated that the coding and bit numbers of the above (1,1) and (0,1) are selected in other ways according to different applications, and not limited to those given in the present disclosure.

FIGS. 6B and 7B show that the feature coding is performed using a shape of the peripheral microdot 313. In a non-limiting embodiment, when the peripheral microdot 313 is a triangular microdot, the feature coding thereof with respect to the center microdot 311 is set as (1,1); whereas when the peripheral microdot 313 is a circular microdot, the feature coding thereof with respect to the center microdot 311 is set as (0,1). For example, FIGS. 6B and 7B show the center microdot 311 being adjacent to two peripheral microdots 313. The feature coding of the left part of figures is set as including two 2-bit codes (1,1) between the upper peripheral microdot 313 and the center microdot(s) 311 and (0,1) between the right peripheral microdot 313 and the center microdot(s) 311, and the right part of figures is set as including two 2-bit codes (0,1) between the upper peripheral microdot 313 and the center microdot(s) 311 and (0,1) between the right peripheral microdot 313 and the center microdot(s) 311. If a coding direction is not defined, a sequence of said two 2-bit codes is not limited. Similarly, the coding and bit numbers of the above (1,1) and (0,1) are selected in other ways according to different applications, and not limited to those given in the present disclosure.

FIGS. 6C and 7C show that the feature coding is performed using a color (R,B) or reflectivity (H,L) of the peripheral microdot 313. In a non-limiting embodiment, when the peripheral microdot 313 is red (R), the feature coding thereof with respect to the center microdot 311 is set as (1,1); when the peripheral microdot 313 is blue (B), the feature coding thereof with respect to the center microdot 311 is set as (0,1); when the peripheral microdot 313 has high reflectivity (H), the feature coding thereof with respect to the center microdot 311 is set as (1,0); and when the peripheral microdot 313 has low reflectivity (L), the feature coding thereof with respect to the center microdot 311 is set as (0,0). For example, FIGS. 6C and 7C show the center microdot 311 being adjacent to two peripheral microdots 313. The feature coding of the left part of figures is set as including two 2-bit codes (1,1) between the upper peripheral microdot 313 and the center microdot(s) 311 and (1,0) between the right peripheral microdot 313 and the center microdot(s) 311, and the right part of figures is set as including two 2-bit codes (0,1) between the upper peripheral microdot 313 and the center microdot(s) 311 and (0,0) between the right peripheral microdot 313 and the center microdot(s) 311. If the coding direction is not defined, a sequence of said two 2-bit codes is not limited. Similarly, the coding and bit numbers of the above (1,1), (0,1), (1,0) and (0,0) are selected in other ways according to different applications, and not limited to those given in the present disclosure.

In addition, it is also possible to perform the feature coding according to a number of the peripheral microdots 313. In a non-limiting embodiment, the feature coding corresponding to one peripheral microdot 313 being arranged at a position having a polar angle is set as 2-bit coding, and the feature coding corresponding to two peripheral microdots 313 being arranged at positions of the same polar angle is set as 3-bit coding. More specifically, different numbers of peripheral microdots 313 at the same polar angle form different codes.

In addition, it is also possible to perform the feature coding according to a permutation of multiple peripheral microdots 313. In a non-limiting embodiment, when the multiple peripheral microdots 313 is arranged to have a triangular shape around the center microdot 311 (e.g., FIG. 3C), a first predetermined feature code is set; and when the multiple peripheral microdots 313 is arranged to have a rectangular shape around the center microdot 311 (e.g., FIG. 3B), a second predetermined feature code is set, wherein the second predetermined code is different from the first predetermined code. More specifically, different permutations of multiple peripheral microdots 313 form different codes.

Figure 8A:
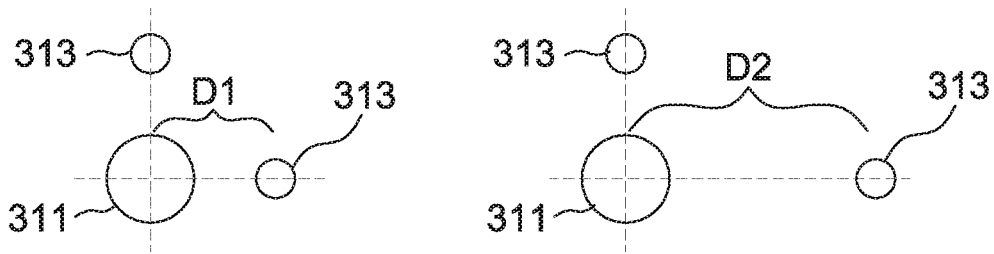
FIGS. 8A-8D are schematic diagrams of some embodiments encoded using the relative feature between a center coding region and a peripheral coding region in the present disclosure.
Figure 8B:
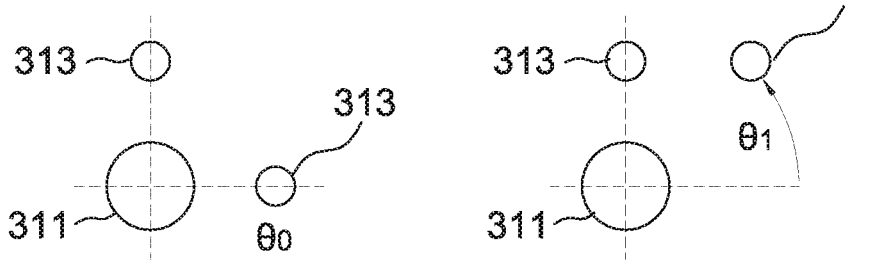
Figure 8C:
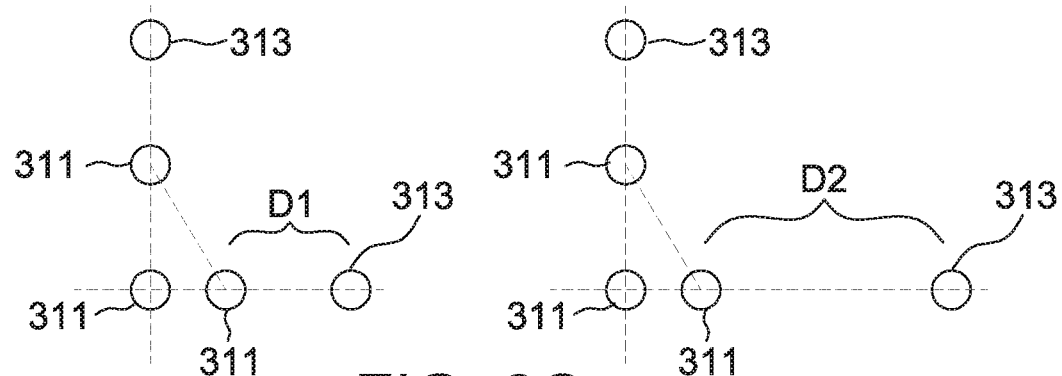
Figure 8D:
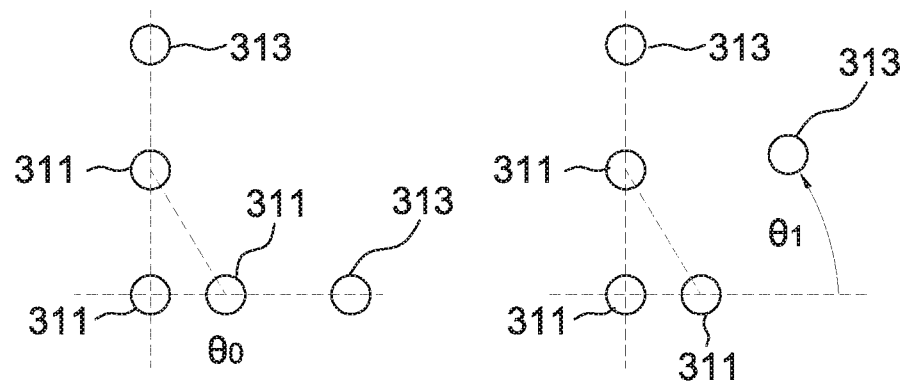

Referring to FIGS. 8A-8D, wherein FIGS. 8A-8B show embodiments of encoding using a single center microdot 311; and FIGS. 8C-8D show embodiments of encoding using multiple center microdots 311. In these embodiments, only the relative feature variation between the center microdot 311 of the center coding region Ac and the peripheral microdot 313 of the peripheral coding region Ap is considered, and it is assumed that the feature of the center microdots 311 and the peripheral microdot 313 themselves is not changed to simplify the illustration. The relative feature includes one or a combination of a relative distance and a relative angle between the peripheral coding region Ap and the center coding region Ac.

FIGS. 8A and 8C show that the feature coding is performed using a distance between the center microdot 311 and the peripheral microdot 313. In a non-limiting embodiment, when a distance between the center microdot 311 and the peripheral microdot 313 is D1, the feature coding thereof is set as 2-bit code, wherein D1 is, for example, one time of a unit distance, and the unit distance is selected as a radius of the center microdot 311, a distance between the center microdots 311 or other predetermined distances; whereas when a distance between the center microdot 311 and the peripheral microdot 313 is D2, the feature coding thereof is set as 3-bit code, wherein D2 is, for example, twice of or other identifiable multiples of the unit distance as long as D2 is different from D1. For example, FIGS. 8A and 8C show the center microdot 311 being adjacent to two peripheral microdots 313. The feature coding of the left part of figures is set as including two 2-bit codes, and the right part of figures is set as including one 2-bit code and one 3-bit code. If a coding direction is not defined, a coding sequence is not limited. It should be mentioned that the coding and bit numbers mentioned above is only intended to illustrate but not to limit the present disclosure. Furthermore, FIG. 8C shows that D1 is a distance between the peripheral microdot 313 and a lower right center microdot 311. In other embodiments, D1 is arranged a distance between the peripheral microdot 313 and other center microdot 311 as long as it is previously set.

FIGS. 8B and 8D show that the feature coding is performed using a polar angle of the peripheral microdot 313 corresponding to the center microdot 311. In a non-limiting embodiment, when a polar angle of the peripheral microdot 313 corresponding to the center microdot 311 is $\theta_0$, the feature coding thereof is set as 2-bit code, wherein $\theta_0$ is, for example, 0 degree; whereas when a polar angle of the peripheral microdot 313 corresponding to the center microdot 311 is $\theta_1$, the feature coding thereof is set as 3-bit code, wherein $\theta_1$ is, for example, a multiple of 10, 15 or 45 degrees. For example, FIGS. 8B and 8D show the center microdot 311 being adjacent to two peripheral microdots 313. The feature coding of the left part of figures is set as including two 2-bit codes, and the right part of figures is set as including one 2-bit code and one 3-bit code. If a coding direction is not defined, a coding sequence is not limited. Similarly, the coding and bit numbers mentioned above is only intended to illustrate but not to limit the present disclosure. Furthermore, FIGS. 8B and 8D show the polar angle with $\theta$. In other embodiments, the polar angle is indicated using an X-distance and a Y-distance from a position of the associated center microdot 311.

It should be mentioned that although FIGS. 4A-4C, 5A-5C, 6A-6C, 7A-7C and 8A-8D are illustrated by changing a single feature, but they are not to limit the present disclosure. It is possible to combine two or more than two features shown in FIGS. 4A-4C, 5A-5C, 6A-6C, 7A-7C and 8A-8D in the coding method of the present disclose so as to implement the multidimensional coding. More specifically, the present disclosure uses the center coding feature and at least one of the peripheral coding feature and the relative coding feature to perform the feature coding. For example, the feature coding is performed using the center coding feature and the peripheral coding feature, using the center coding feature and the relative coding feature, or using the center coding feature, the peripheral coding feature and the relative coding feature.

The above embodiments gave the examples without defining a coding direction such that a lower code number is obtained. To increase a number of codes to be used, the present disclose further uses at least one of the center coding feature, the peripheral coding feature and the relative coding feature to determine a coding direction. The processor 332 determines a start code of the feature code according to the coding direction. After the start code is determined, the processor 332 sequentially performs the feature coding on the microdots in a clockwise or a counterclockwise direction from the start code.

Figure 9A:
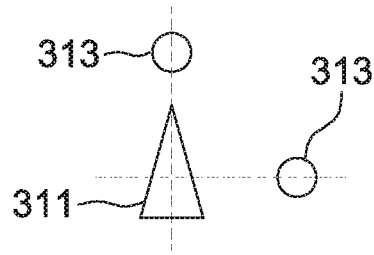
FIGS. 9A-9B are schematic diagrams of some embodiments which define a coding direction using a single center microdot of a center coding region in the present disclosure.
Figure 9B:
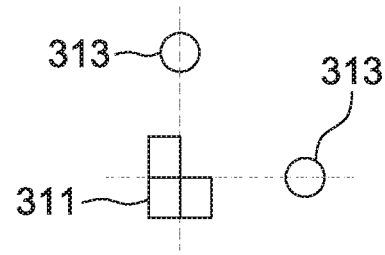

Referring to FIGS. 9A and 9B, they show embodiments of determining a coding direction using a single center microdot 311. In this embodiment, the single center microdot 311 has an asymmetrical feature to allow the processor 332 to identify a specific direction and use the specific direction as a start direction of the coding. For example, FIG. 9A shows a triangle having a height in a longitudinal direction larger than a width in a transverse direction. The processor 332 identifies an upward direction or a downward direction as a start direction of coding, and performs the coding in a clockwise or counterclockwise direction from the start direction. For example, FIG. 9B shows a rectangle missing a right upper part. The processor 332 identifies an upward direction or a rightward direction as a start direction of coding, and performs the coding in a clockwise or counterclockwise direction from the start direction. It is appreciated that the coding direction is defined according to other asymmetrical shapes of the single center microdot 311, and is not limited to those shown in FIGS. 9A and 9B.

Figure 10A:
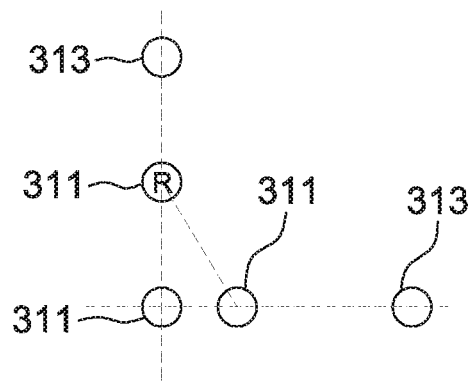
FIGS. 10A-10D are schematic diagrams of some embodiments which define a coding direction using multiple microdots of a center coding region in the present disclosure.
Figure 10B:
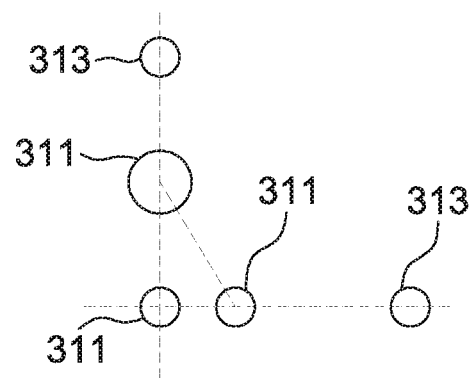
Figure 10C:
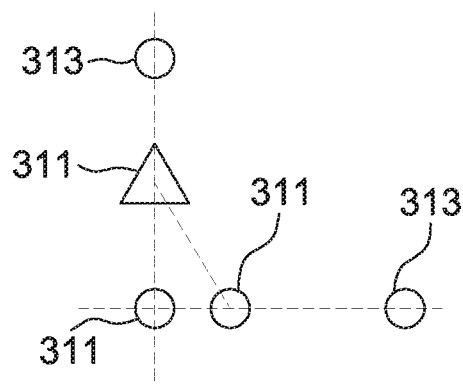
Figure 10D:
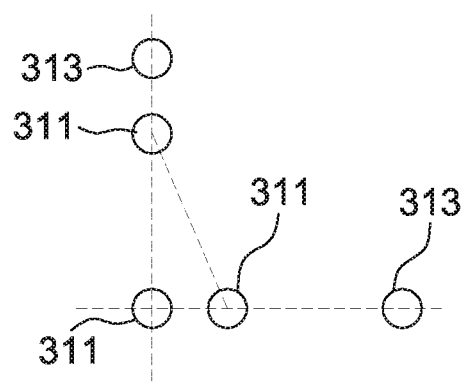

Referring to FIGS. 10A to 10D, they show embodiments of determining a coding direction using multiple center microdots 311. In this embodiment, the coding direction is determined according to at least one of the multiple center microdots 311 which has a different feature from other center microdots 311. For example, FIG. 10A shows an upper center microdot 311 has a red or high reflectivity feature. The processor 332 identifies an upward direction or a downward direction as a start direction of coding, and performs the coding in a clockwise or counterclockwise direction from the start direction. For example, FIG. 10B shows an upper center microdot 311 has a larger size (e.g., larger than a predetermined size). The processor 332 identifies an upward direction or a downward direction as a start direction of coding, and performs the coding in a clockwise or counterclockwise direction from the start direction. For example, FIG. 10C shows an upper center microdot 311 has a different shape. The processor 332 identifies an upward direction or a downward direction as a start direction of coding, and performs the coding in a clockwise or counterclockwise direction from the start direction. For example, FIG. 10D shows the multiple center microdots 311 have an identical feature, and the multiple center microdots 311 are arranged to have a right triangular shape. The processor 332 identifies a direction of the long leg of the right triangle as a start direction of coding, and performs the coding in a clockwise or counterclockwise direction from the start direction. That is, the present disclosure further determines the coding direction according to the permutation of multiple center microdots 311. It is appreciated that the above coding direction is defined along other directions according to different applications, and is not limited to those shown herein.

Figure 12A:
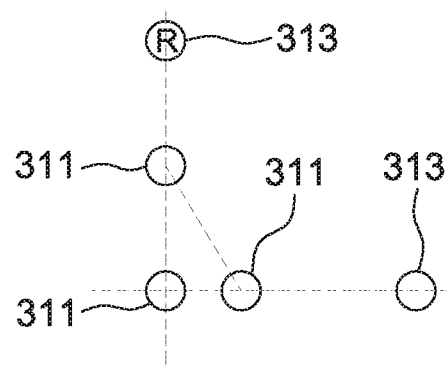
FIGS. 12A-12D are schematic diagrams of alternative embodiments which define a coding direction using at least one microdot of a peripheral coding region in the present disclosure.
Figure 12B:
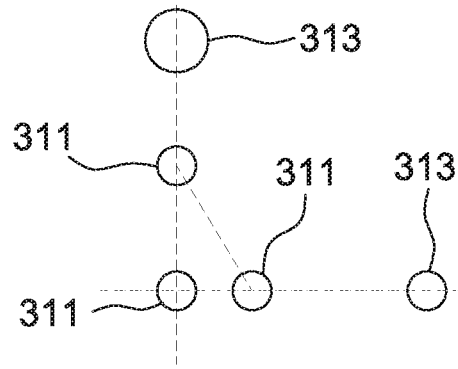
Figure 12C:
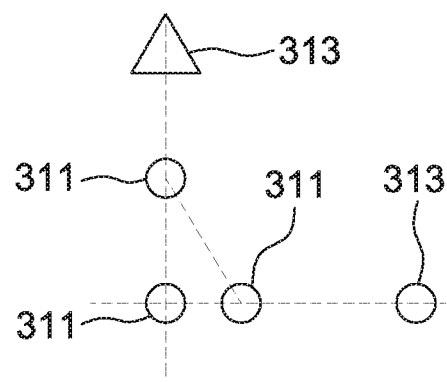
Figure 12D:
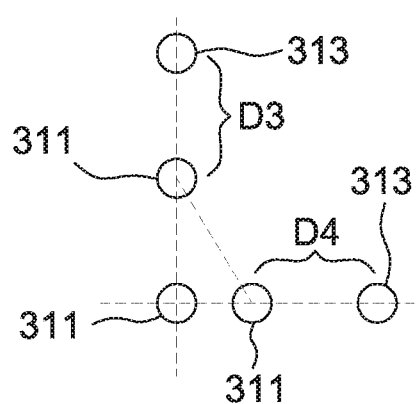

Referring to FIGS. 11A-11D and 12A-12D, wherein FIGS. 11A-11D show embodiments of determining a coding direction using the peripheral microdot 313 disposed around a single center microdot 311; and FIGS. 12A-12D show embodiments of determining a coding direction using the peripheral microdot 313 disposed around multiple center microdots 311. In these embodiments, it is assumed that the feature of the center microdot 311 is not changed to simplify the illustration. For example, FIGS. 11A and 12A show that the upper peripheral microdot 313 has a red feature or higher reflectivity. The processor 332 identifies an upward or downward direction as a start direction of coding and performs the coding accordingly. For example, FIGS. 11B and 12B show that the upper peripheral microdot 313 has a larger size (e.g., larger than a predetermined size). The processor 332 identifies an upward or downward direction as a start direction of coding and performs the coding accordingly. For example, FIGS. 11C and 12C show that the upper peripheral microdot 313 has a different shape. The processor 332 identifies an upward or downward direction as a start direction of coding and performs the coding accordingly. For example, FIGS. 11D and 12D show the upper peripheral microdot 313 has a relative distance D3 from the center microdot 311 and the right peripheral microdot 313 has a relative distance D4 from the center microdot 311, wherein D3>D4 and the distances are defined according to a multiple of the unit distance as mentioned above. The processor 332 identifies an upward or rightward direction as a start direction of coding and performs the coding accordingly. That is, the present disclosure further determines a coding direction according to a relative distance between the peripheral microdot 313 and the center microdot 311. It is appreciated that the above start direction of coding is determined along other directions according to different applications, and is not limited to those give in the present disclosure. In addition, as mentioned above it is possible that the distances D3 and D4 are set as a distance from the peripheral microdot 313 to other center microdot 311.

Similarly, although FIGS. 9A-12D show that the coding direction is defined using a single feature variation, it is not to limit the present disclosure. In other embodiments, the coding direction is defined using combining features of FIGS. 9A-12D.

Figure 13:
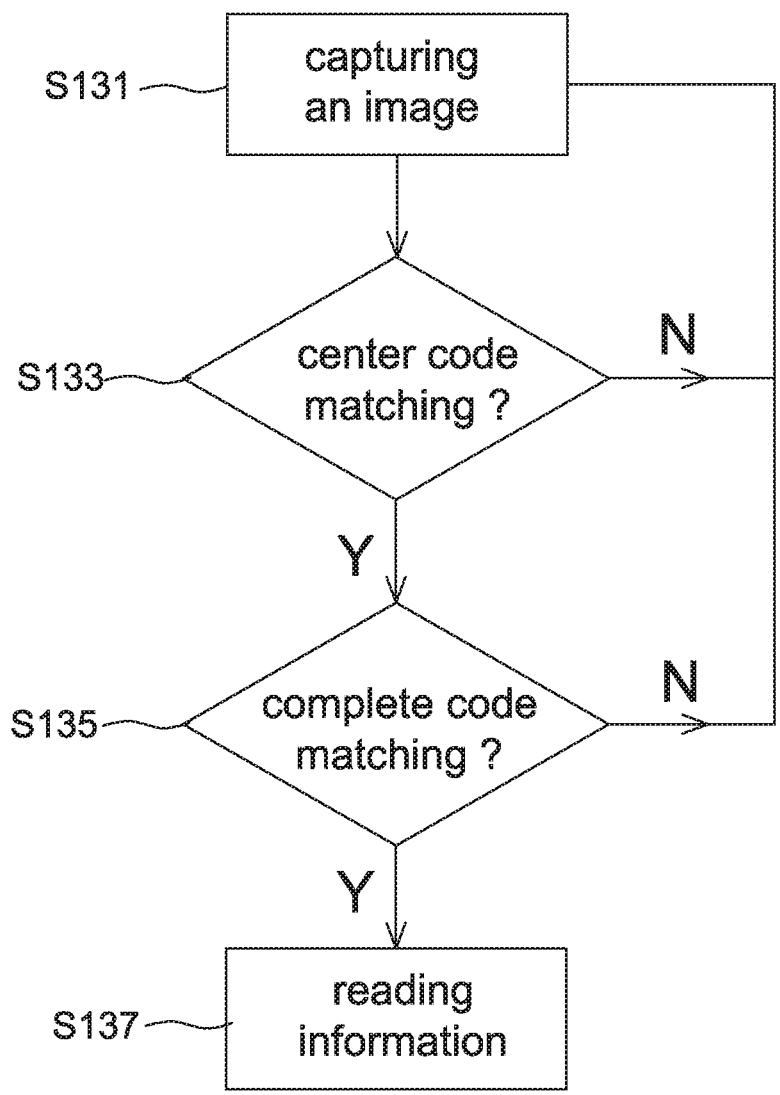
FIG. 13 is a flow chart of a decoding method according to one embodiment of the present disclosure.

Referring to FIG. 13, it is a flow chart of a decoding method of an information recognition device 33 according to one embodiment of the present disclosure. The decoding method includes the steps of: capturing a current image by an image sensor (Step S131); comparing a feature code in the current image with a plurality of predetermined feature codes in a memory to confirm whether a predetermined center coding feature is contained in the current image (Step S133); comparing the feature code in the current image with the plurality of predetermined feature codes in the memory to confirm whether a predetermined complete coding feature is contained in the current image (Step S135); and reading, from the memory, coding information corresponding to the predetermined complete coding feature (Step S137).

Referring to FIGS. 3-13, a non-limiting embodiment of this decoding method is illustrated hereinafter.

Step S131: A user operates the information recognition device 33 to move on the read medium 31 to allow the image sensor 331 to capture a current image using a sampling frequency. As a pointed position on the read medium 31 is random, it is possible that the current image does not contain a complete code block 310 on the read medium 31. The present disclosure preferably recognizes a center coding feature of the current image at first and then identifies other coding features.

Step S133: The processor 332 receives raw data of the current image from the image sensor 331, and identifies the feature code, e.g., coded by one or a combination of features shown in FIGS. 4A-12D, in the current image. When the feature code in the current image is identified, the identified feature code is then compared, by the processor 332, with a plurality of predetermined feature codes pre-stored in the memory 333. For example, in this embodiment, the processor 332 firstly identifies whether the current image contains a predetermined center coding feature, which corresponds to the code blocks 310 arranged on the read medium 31 and previously recorded in the memory 333. When the feature code in the current image does not contain the predetermined center coding feature, a new image is captured. The Step S135 is not entered until the captured current image contains one of a plurality of predetermined center coding feature stored in the memory 333.

Step S135: After identifying that the feature code in the current image contains the predetermined center coding feature, the processor 332 then compares the feature code in the current image with the plurality of predetermined feature codes in the memory 333 to confirm whether a predetermined complete coding feature is contained in the current image, wherein the predetermined complete coding feature includes the predetermined center coding feature and at least one of a predetermined peripheral coding feature as well as a predetermined relative coding feature. When the current image does not contain the predetermined complete coding feature, the Step S131 is returned to capture a new image. The Step S137 is not entered until the captured current image contains one of a plurality of predetermined complete coding feature stored in the memory 333.

In a non-limiting embodiment, the predetermined center coding feature includes at least one of a size, a color, a shape, a number, a permutation and reflectivity of at least one center microdot (e.g., FIGS. 4A-4C and 5A-5C); the predetermined peripheral coding feature includes at least one of a size, a color, a shape, a number, reflectivity and a permutation of at least one peripheral microdot (e.g., FIGS. 6A-6C and 7A-7C); and the predetermined relative coding feature includes at least one of a relative distance and a relative angle between a peripheral coding region and a center coding region (e.g., FIGS. 8A-8D).

In some embodiments, the processor 332 does not identify a sequence of feature codes as long as the current image matches predetermined feature codes in the memory 333. In other embodiments, after the processor 332 identifies a predetermined complete coding feature, a coding sequence is further identified (simultaneously or sequentially) and uses the predetermined complete coding feature to determine a start code of the feature code in the current image, e.g., referring to the embodiments shown in FIGS. 9A-9B, 10A-10D, 11A-11D and 12A-12D. Whether the coding sequence is identified is determined according to different applications.

Step S137: Finally, the processor 332 reads, from the memory 333, coding information corresponding to the identified feature code in the current image, and transmits wired or wirelessly the coding information to an external electronic device for corresponding control. In some embodiments, the information recognition device 33 operates correspondingly to the identified feature code, e.g., the information recognition device 33 including a speaker to play predetermined audio or includes a light source to emit light with predetermined color or with predetermined emission mode, but not limited thereto.

It should be mentioned that although FIGS. 4A-12D show dotted lines between microdots 311 and 313, they are only intended to indicate the position and angle relationship between microdots. The dotted lines are not necessary to be formed on the read medium 31 in actual applications.

It should be mentioned that the shape of microdots in the above embodiments is not limited to a shape of circle, triangle or rectangle, but is other shapes as long as it is identifiable by the processor 332, e.g., a cross symbol or an arrow symbol.

It should be mentioned that although the above embodiments are illustrated by using a single peripheral coding region surrounding the center coding region (e.g., FIGS. 3A-3C), the present disclosure is not limited thereto. In other non-limiting embodiments, more than one layer of peripheral coding regions is arranged outside of the center coding region Ac to form an annular coding. A distance between the center coding region Ac and the closest peripheral coding region therefrom is preferably larger than a first predetermined distance to separate two coding regions, and a distance between the peripheral coding regions is preferably larger than a second predetermined distance (equal to or different from the first predetermined distance) to separate two coding regions. Said different peripheral coding regions combine the features in the drawings of the present disclosure to implement the coding.

It is appreciated that although in the above embodiments the center coding region Ac is illustrated by having 1 or 3 center microdots 311, and the peripheral coding region Ac is illustrated by having 2 peripheral microdots 313, they are only intended to illustrate but not to limit the present disclosure. In other embodiments, a total number of the center microdots 311 and the peripheral microdots 313 has, for example, but not limited to, 10 to 16 microdots to form enough code numbers. That is, the total number of the center microdots 311 and the peripheral microdots 313 is determined according to actual requirements without particular limitations.

It should be mentioned that although the above embodiments are illustrated by an optical recognition device (e.g., the information recognition device 33), the present disclosure is not limited thereto. In other embodiments, the codes formed by the above embodiments are read and decode using a capacitive recognition method. As long as a capacitive recognition device is able to distinguish the center coding region, the peripheral coding region and the feature relationship therebetween, the decoding can be implemented. For example, the center microdots 311 and the peripheral microdots 313 are simple conductors or have voltages applied thereon, and a capacitive recognition device (e.g., a capacitive touch panel) is able to recognize coding feature according to positions, sizes and voltage intensity of two region codes so as to read coding information. In an alternative embodiment, the information recognition device 33 reads the distribution of pressure values which are arranged as the present disclosure to include a center coding region and a peripheral coding region. The processor 332 compares the read pressure value distribution with pre-stored distribution to read coding information.

The difference between the capacitive recognition device and pressure recognition device from the above optical recognition device is only on the way of sensing information, but the decoding performed by the processor 332 is similar. A person skilled in the art would understand the operation of the capacitive recognition device and pressure recognition device after understanding the operation of the above optical recognition device (e.g., the information recognition device 33), and thus details thereof are not described herein.

As mentioned above, position codes of the conventional handwrite recognition system are encoded as a matrix, and the encoding and decoding are performed only according to present positions of microdots. The present disclosure further provides an encoding and decoding method based on multilayer microdots (e.g., FIGS. 4A to 13) and an information recognition device using the same (e.g. FIG. 3) that encode and decode according to the feature of different coding regions and the relative feature therebetween so as to effectively increase a number of usable codes. In addition, a coding direction is selected to be identified to be applied to different applications.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An encoding method of one feature code among multiple feature codes on a read medium, the encoding method comprising:
    arranging at least one center microdot having a center coding feature;
    arranging at least one peripheral microdot having a peripheral coding feature, wherein the at least one peripheral microdot is arranged around the at least one center microdot;
    arranging a relative coding feature between the at least one center microdot and the at least one peripheral microdot;
    determining a start direction of feature coding of the one feature code according to at least one of the center coding feature, the peripheral coding feature and the relative coding feature; and
    performing the feature coding using the center coding feature and at least one of the peripheral coding feature and the relative coding feature in a clockwise direction or a counterclockwise direction from the start direction of the one feature code.

2. The encoding method as claimed in claim 1, wherein the center coding feature comprises at least one of a size, a color, a shape, a number, reflectivity and a permutation of the at least one center microdot.

3. The encoding method as claimed in claim 1, wherein the peripheral coding feature comprises at least one of a size, a color, a shape, a number, reflectivity and a permutation of the at least one peripheral microdot.

4. The encoding method as claimed in claim 1, wherein the relative coding feature comprises at least one of a relative distance and a relative angle between the at least one peripheral microdot and the at least one center microdot.

5. The encoding method as claimed in claim 1, wherein the feature coding comprises at least one of
    a position code for indicating a position of the one feature code,
    an object code for indicating an object in which the one feature code locates,
    a parameter code for retrieving a parameter corresponding to the one feature code, and
    a control code for retrieving a control signal corresponding to the one feature code.

6. The encoding method as claimed in claim 1, wherein
the at least one center microdot is arranged within a center coding region having a center radius,
the at least one peripheral microdot is arranged within a peripheral coding region separated from the center coding region by a relative distance, and
the relative distance is larger than or equal to twice of the center radius.

7. The encoding method as claimed in claim 6, wherein no microdot is arranged within the relative distance between the center coding region and the peripheral coding region.

8. The encoding method as claimed in claim 6, wherein the relative distance is
a distance of the at least one peripheral microdot of the peripheral coding region from an average gravity center of the at least one center microdot of the center coding region, or
a distance of the at least one peripheral microdot of the peripheral coding region from a gravity center of one microdot among the at least one center microdot of the center coding region.

9. An information recognition device for decoding feature codes on a read medium, the information recognition device comprising:
an image sensor configured to capture a current image;
a memory configured to previously store a plurality of predetermined feature codes each comprising at least one center microdot having a center coding feature, at least one peripheral microdot having a peripheral coding feature and a relative coding feature between the at least one center microdot and the at least one peripheral microdot; and
a processor configured to
analyze a feature code in the current image,
compare the analyzed feature code with the plurality of predetermined feature codes in the memory,
determine a start direction and a coding direction from the start direction in a clockwise direction or a counterclockwise direction within the analyzed feature code in the current image according to at least one of the center coding feature, the peripheral coding feature and the relative coding feature, and
read coding information, which corresponds to the analyzed feature code in the current image, from the memory.

10. The information recognition device as claimed in claim 9, further comprising a transmission interface configured to send the coding information to an external electronic device.

11. The information recognition device as claimed in claim 9, wherein the processor is further configured to determine a start code of the analyzed feature code in the current image according to the coding direction.

12. The information recognition device as claimed in claim 9, wherein
the center coding feature comprises at least one of a size, a color, a shape, a number, reflectivity and a permutation of the at least one center microdot,
the peripheral coding feature comprises at least one of a size, a color, a shape, a number, reflectivity and a permutation of the at least one peripheral microdot, and
the relative coding feature further comprises at least one of a relative distance and a relative angle between the at least one peripheral microdot and the at least one center microdot.

* * * * *